United States Patent [19]
Davis

[11] Patent Number: 5,817,948
[45] Date of Patent: Oct. 6, 1998

[54] ELECTROMAGNETIC FLOWMETER WITH NON-PROTRUDING CONTACTING ELECTRODES AND METHOD FOR PRODUCING THE SAME

[75] Inventor: James W. Davis, New Britain, Pa.

[73] Assignee: Elsag International N.V., Amsterdam, Netherlands

[21] Appl. No.: 781,354

[22] Filed: Jan. 21, 1997

[51] Int. Cl.$^6$ ...................................................... G01F 1/58
[52] U.S. Cl. ..................................... 73/861.12; 73/861.11
[58] Field of Search ........................... 73/861.11, 861.12, 73/861.13, 861.15, 861.16, 861.17

[56] References Cited

U.S. PATENT DOCUMENTS

| | | | |
|---|---|---|---|
| 2,770,130 | 11/1956 | Romanowski et al. | 73/861.12 |
| 3,171,990 | 3/1965 | Bennett | 73/861.11 |
| 3,180,144 | 4/1965 | Bennett | 73/861.12 |
| 3,754,824 | 8/1973 | Mannherz et al. | 73/194 |
| 4,269,071 | 5/1981 | Wada | 73/861.12 |
| 4,912,838 | 4/1990 | Goto et al. | 73/861.12 |
| 5,280,727 | 1/1994 | Hafner et al. | 73/861.12 |

FOREIGN PATENT DOCUMENTS 5-99716  4/1993  Japan ................................. 73/861.12

Primary Examiner—Ronald L. Biegel
Attorney, Agent, or Firm—Andrew L. Ney; Michael M. Rickin

[57] ABSTRACT

A method of manufacturing an electromagnetic flowmeter and an electromagnetic flowmeter wherein the measuring electrodes do not protrude into the flow channel and instead form part of the flow channel wall. The method for manufacturing the flowmeter includes the steps of forming the flowmeter body with a central channel smaller than that which is desired for final flowmeter use, inserting into the body electrodes with tapered tips which extend into the central channel, and reaming the central channel whereby the central channel is enlarged to its final diameter and the electrode tips are cut. The cut tips form concave cross sectional areas which are continuous and flush with the central channel wall. The resultant flowmeter has measuring electrodes which do not protrude into the channel. This substantially reduces turbulent flow of the measured liquid as it passes through the measuring region of the flowmeter, and a more accurate reading results.

2 Claims, 2 Drawing Sheets

ELECTROMAGNETIC FLOWMETER WITH NON-PROTRUDING CONTACTING ELECTRODES AND METHOD FOR PRODUCING THE SAME

BACKGROUND OF THE INVENTION

This invention relates generally to electromagnetic flowmeters, and more particularly to an electromagnetic flowmeter with non-protruding contacting electrodes and a method of manufacturing the same.

The operation of an electromagnetic flowmeter is based on Faraday's law of electromagnetic induction, which is described in detail in U.S. Pat. No. 3,745,824. Applying Faraday's law, a flow rate may be measured by allowing the liquid of interest to be passed through a magnetic field, thereby producing a voltage which can be detected by diametrically opposed electrodes and converted into a flow rate signal. Since the induced voltage is proportional to the average velocity of the liquid, the electromagnetic flowmeter can be calibrated to indicate the volumetric flow rate of the liquid passing through it.

There are a number of different ways for installing the electrodes. In one, the electrode is inserted into a sleeve which lines a cavity perpendicular to the flow channel. In a second, the electrode is screwed into place using threaded connections. In another, the electrode is attached to a disk and the disk is placed between two flanged fittings. All, generally, require excessive installation time and expense.

Another shortcoming of the above methods is the interruption of the flow profile caused by the contact between the electrode and the liquid. In some of the known prior art, the electrodes protrude into the flow stream. The protruding electrodes create eddies as the liquid flows past. This creation of turbulent flow also creates noise as sensed by the electrodes, which leads to inaccurate flowmeter readings. It is therefore desirable to minimize the turbulence created by the electrodes protruding into the liquid. In fact, the liquid to be measured should preferably demonstrate completely laminar flow characteristics as it passes between the measuring electrodes to insure the most accurate measurement. (Those skilled in the art recognize that laminar flow occurs when the Reynolds number is less than 2000.) Moreover, because the accuracy of the reading depends on detection of the voltage created by the liquid passing through the magnetic field, it is important to remove stray charges, or noise, from the liquid so that the only voltage produced is that which is created by the passage of the liquid through the magnetic field.

An additional shortcoming of the previously mentioned methods is that different size electrodes are required for different size flowmeters. It is important that there is at least a minimum surface area exposure between the electrode and the liquid. This minimum surface area is calculated based on the electrical characteristics of the electrode material and the necessary grounding and measuring that must occur. The volume of liquid passing through larger bored flowmeters requires a greater surface area of exposed electrode than a smaller bored meter with lower volumetric flow. Thus, as the bore diameter increases, so must the surface area of the electrode exposed to the liquid. With respect to the methods of electrode installation discussed previously, a different size electrode is often fabricated for each different size flowmeter.

SUMMARY OF THE INVENTION

Accordingly, a method for manufacturing an electromagnetic flowmeter in accordance with the present invention includes the step of forming an electromagnetic flowmeter body comprising a central channel having a diameter smaller than that which is desired for final flowmeter use, and at least one tapered cavity extending from the channel. Next, an electrode having a tapered tip is inserted into the cavity such that the tip of the electrode extends into the central channel. The last step includes machining the central channel whereby the tip extending into the channel is cut resulting in an exposed concave cross-sectional area of the electrode forming part of the channel wall.

An electromagnetic flowmeter, constructed in accordance with the present invention, includes a non-conductive body having a central channel, first and second diametrically opposed cavities extending from the central channel and having a tapered region extending from the central channel, and third and fourth cavities extending from the central channel, relative to liquid flow through the central channel, upstream and downstream of the first and second cavities, respectively. This electromagnetic flowmeter also has first and second measuring electrodes each having a tapered tip, respectively, positioned in the first and second cavities, and having a concave cross-sectional area of the same curvature as the central channel where the cavity reaches the central channel. Additionally, there are third and fourth grounding electrodes, respectively, positioned in the third and fourth cavities and means for developing a magnetic field extending through the central channel.

DETAILED DESCRIPTION OF THE INVENTION

Figure 1:
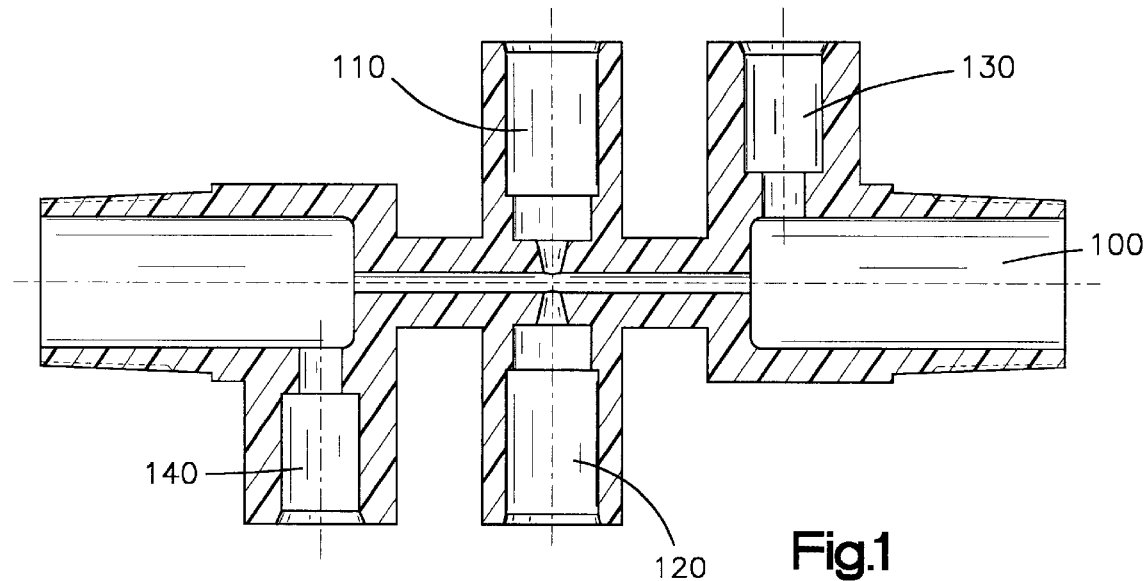
FIG. 1 is a cross sectional view of a flowmeter body prior to insertion of electrodes.
Figure 2:
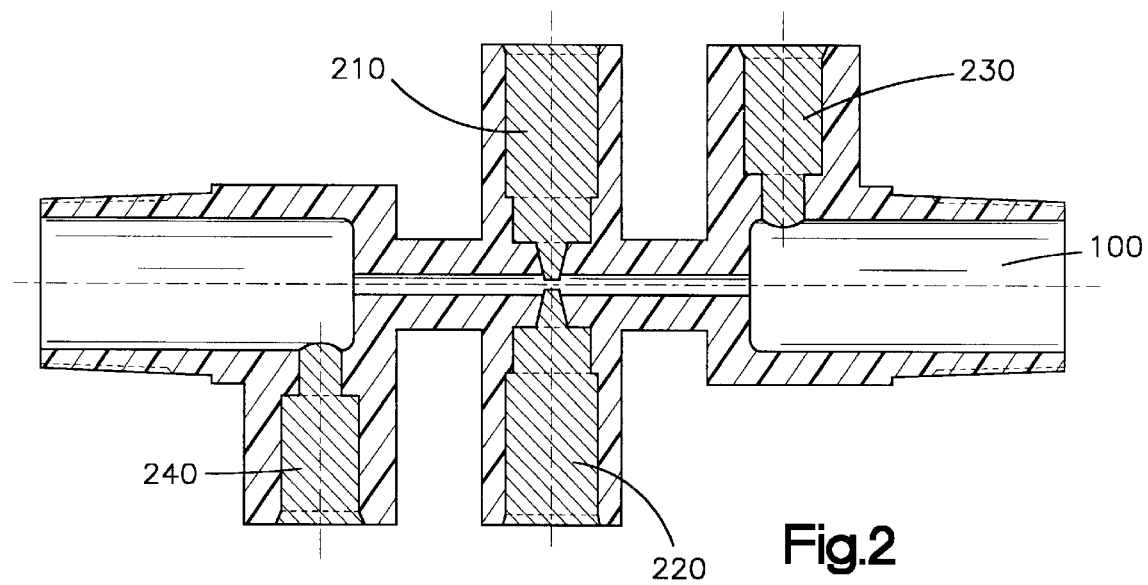
FIG. 2 is a cross sectional view of a flowmeter body after insertion of electrodes but prior to machining the central channel.
Figure 3:
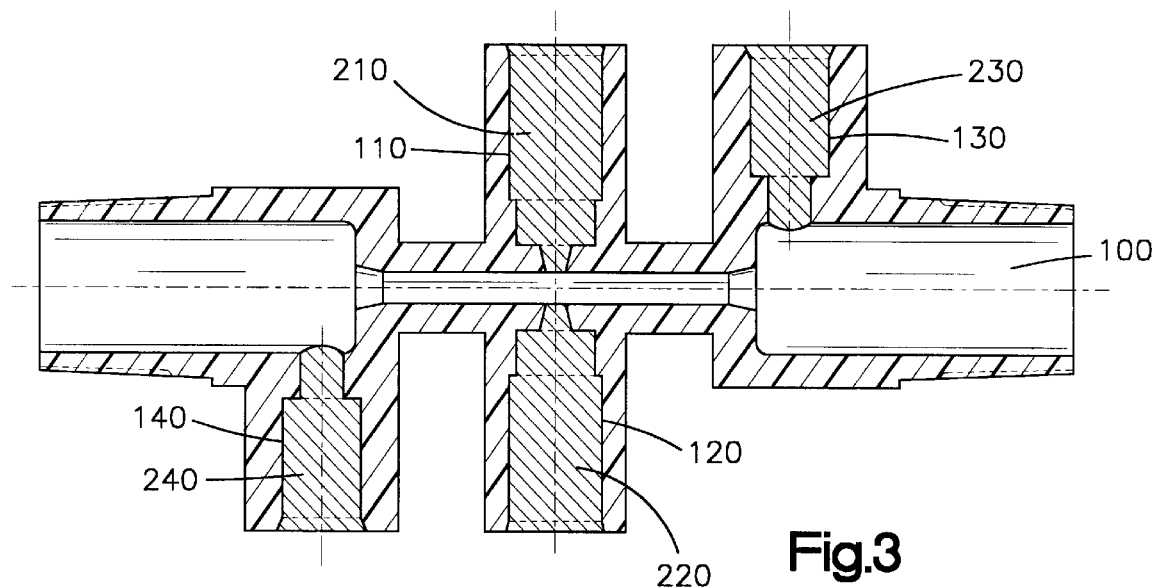
FIG. 3 is a cross sectional view of a flowmeter body after reaming the central channel.
Figure 4:
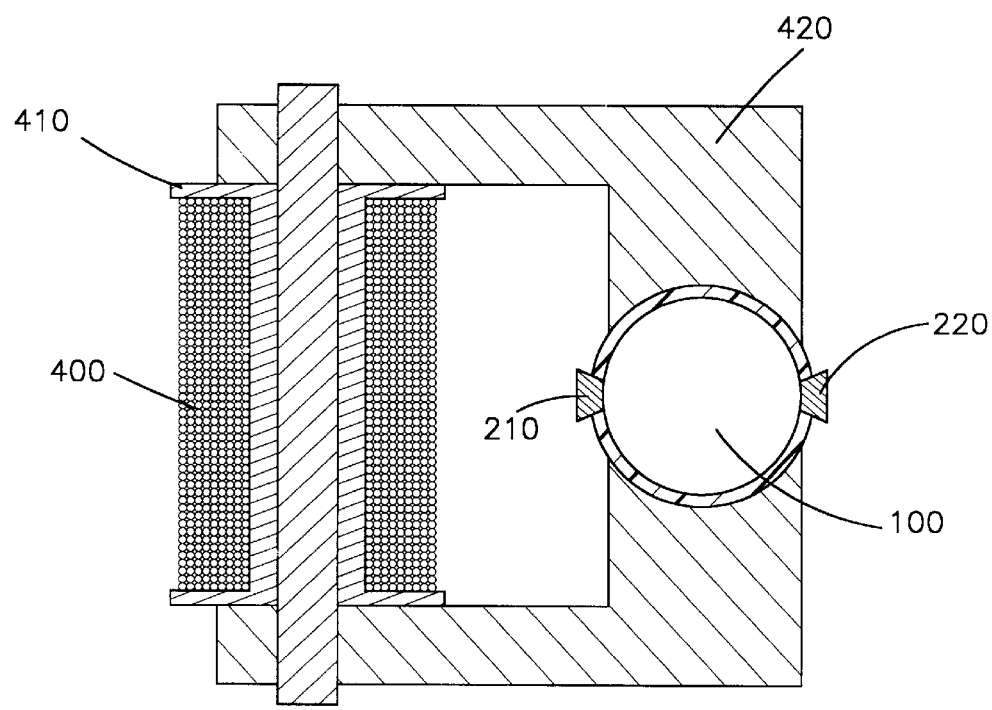
FIG. 4 is a cross sectional view of apparatus for developing a magnetic field which extends through the flowmeter of FIG. 3.

FIGS. 1, 2, and 3 show the progression of a flowmeter body through each of the main steps used for producing the flowmeter in accordance with the present invention. FIG. 1 shows the flowmeter body in its initial form which includes a central channel 100 having a diameter smaller than that which is desired for final flowmeter use, and at least one tapered cavity 110 extending from the central channel. The flowmeter body shown in FIG. 1 has two such cavities, 110 and 120, and two non-tapered cavities, 130 and 140.

FIG. 2 shows the second step for producing a flowmeter according to the present invention. An electrode is inserted into each of the cavities. Electrodes 210 and 220 each have a tapered tip extending into central channel 100. Electrodes 230 and 240 each have a tip extending slightly into central channel 100.

FIG. 3 shows the result of the final step for producing a flowmeter according to the present invention. The third step involves machining central channel 100, whereby the tips of electrodes 210 and 220 extending into the central channel are cut resulting in an exposed concave cross-sectional area of the electrode forming part of the central channel wall.

Completing the flowmeter are means for developing a magnetic field extending through central channel 100. FIG.

4 shows an apparatus commonly used for creating this magnetic field. The apparatus consists of a conductive wire coil 400, coiled around a spool piece 410. A current is passed through the conductive wire coil 400 and the magnetic field generated is focused, via a yoke 420, across central channel 100, perpendicular to both the central channel and the longitudinal axis of the measuring electrodes 210 and 220.

The machining process discussed above demonstrates the value of forming the measuring electrodes with tapered tips. The machining may be done to form the central channel 100 having various diameters. As the diameter of the central channel 100 increases, so does the area of flow through that channel. As the area of flow increases, so must the surface area of the electrode exposed to the liquid. This increase in exposed electrode cross sectional area as a function of central channel 100 diameter is advantageous over a straight-tipped electrode because only one size electrode need be manufactured for a variety of flowmeter applications.

The machining process is also advantageous because the electrode is exposed to the liquid without the electrode interrupting the liquid flow. As a result of the reaming process, the exposed electrode is flush with the side of the channel wall. The concave cross-sectional area of the electrode tip formed by the reaming process is continuous with the channel wall where the tip of the electrode and associated cavity reach the central channel. This means there is no interruption of liquid flow as the liquid passes the exposed electrode, and consequently no turbulence or electrical noise is created.

Although the present invention has been described with reference to exemplary embodiments, it is not limited thereto. Rather, the appended claims should be construed to include other variants and embodiments of the invention which may be made by those of ordinary skill in the art without departing from the true spirit and scope of the present invention.

What is claimed:

1. A method of manufacturing an electromagnetic flowmeter comprising the steps of:

forming an electromagnetic flowmeter body comprising:
   (a) a central channel having a diameter smaller than that which is desired for final flowmeter use, and
   (b) at least one tapered cavity extending from said channel;

inserting into said cavity an electrode having a tapered tip extending into said central channel; and machining said central channel including said tip extending into said channel, resulting in an exposed concave surface of said electrode which is part of a continuous surface with said channel after reaming.

2. An electromagnetic flowmeter comprising:

a non-conductive body having:
   (a) a central channel,
   (b) first and second diametrically opposed cavities extending from said central channel, and having a tapered region extending from said central channel, and
   (c) third and fourth cavities extending from said central channel upstream and downstream, relative to liquid flow through said central channel, of said first and second cavities, respectively;

first and second measuring electrodes each having a tapered tip, positioned in said first and second cavities, respectively, and having a concave cross-sectional area continuous with the wall of said central channel where said tip and associated cavity reach said central channel;

third and fourth grounding electrodes respectively positioned in said third and fourth cavities; and means for developing a magnetic field extending through said central channel.

\* \* \* \* \*